United States Patent [19]
Perkins

[11] 3,744,324
[45] July 10, 1973

[54] TORSIONAL ROTARY SHAFT SEAL
[75] Inventor: John F. Perkins, Monroeville, Pa.
[73] Assignee: Westinghouse Electric Corporation, Pittsburgh, Pa.
[22] Filed: Jan. 21, 1971
[21] Appl. No.: 108,262

[52] U.S. Cl. .............................................. 74/18.1
[51] Int. Cl. ........................................... F16j 15/52
[58] Field of Search ................... 74/18.1, 18.2, 18; 200/146 A, 146 R, 148 A, 148 F, 148 R, 149 R

[56] References Cited
UNITED STATES PATENTS
1,807,139    5/1931    Volodimirov ...................... 74/18.1
3,028,761    4/1962    Cole, Jr. ............................. 74/18 X
3,489,019    1/1970    Giegerich ............................ 74/18

Primary Examiner—Charles J. Myhre
Assistant Examiner—F. D. Shoemaker
Attorney—A. T. Stratton, C. L. McHale and W. R. Crout

[57] ABSTRACT

A rotary torsional shaft seal is provided, comprising an elastomeric annular seal, which is clamped to both a rotatable shaft and also to a stationary housing member, and having a non-frictional resisting flange portion to prevent deterioration of the elastomeric seal. To provide a hermetic torsional rotary shaft seal, preferably the seal is chemically bonded to both the shaft and also to the container housing. Additionally, a collar having a non-frictional surface is preferably secured to the rotatable shaft to prevent binding between the elastomeric flange portion of the seal and the interface between the shaft and the housing at the clearance opening therebetween.

A modification of the rotary shaft seal includes one or more convolutions of the elastomeric seal with friction resisting collars disposed between the convolutions. As in the first mentioned construction, a chemical bonding between the seal and the shaft and also the housing is preferably provided.

10 Claims, 7 Drawing Figures

Patented July 10, 1973 3,744,324

OPEN

TORSIONAL ROTARY SHAFT SEAL

CROSS REFERENCES TO RELATED APPLICATIONS

Applicant is not aware of any related applications pertinent to the present invention.

BACKGROUND OF THE INVENTION

There are many applications where a torsional rotary shaft seal is desired between a rotatable shaft and a housing, through a wall portion of which the rotatable shaft extends. When the shaft constantly rotates in one direction, Chevron seals, in conjunction with Belleville springs, may be used at the shaft. The Chevron seals consist of V-shaped rings of Teflon, compressed radially between the shaft and that part of the container housing parallel to the shaft axis. These Teflon rings are also compressed axially by Belleville springs against that part of the housing radial to the shaft axis. These Chevron seals are also not considered to be hermetic.

Where, instead of the shaft constantly rotating in one direction, it rotates only over a small angular degree of travel, say 90°, the use of elastomeric sleeves clamped to both the housing and to the shaft have been heretofore employed. Reference may be made to the following U.S. patents for typical sealing constructions involving an elastomeric sleeve clamped to both the shaft and to the housing: Lingal, U.S. Pat. No. 2,889,434, issued June 2, 1959; Lingal, U.S. Pat. No. 2,769,063, issued Oct. 30, 1956; Owens, U.S. Pat No. 3,077,526, issued Feb. 12, 1963; and Upton, U.S. Pat. No. 2,853,584, issued Sept. 23, 1958.

The problem of providing an adequate seal is particularly acute in circuit breakers utilizing a gas under pressure. For example, in a particular type of circuit breaker, utilizing sulfur-hexafluoride ($SF_6$) gas under pressure, it is necessary to transmit mechanical motion from a point externally of the housing containing gas to a point interiorly thereof to a linkage, which actuates the movable contact within the gas-filled enclosure. For instance, the gas may be at a pressure of say 70 psi, for example, and it is necessary to maintain and to preserve this gas for subsequent interruptions. The circuit breaker is designed to operate over a span of time, say 15 to 20 years, without appreciable loss of gas pressure. To maintain a proper seal at the shaft is of prime importance. Reference may be had to U.S. Pat. application filed Jan. 8, 1968, Ser. No. 696,415, and refiled as continuation-in-part patent application, Ser. No. 51,709, filed July 1, 1970 by Stanislaw A. Milianowicz, entitled "Fluid-Blast Circuit Interrupter With Insulating Arc Shield", and assigned to the assignee of the instant application. In the circuit-interrupter equipment described in this patent application, an angular throw of approximately 72° is required of the shaft to transmit the external mechanical motion to the internally-located movable contact structure. The gas pressure internally of the interrupter may be approximately 76 psi, for example.

An additional requirement for a shaft seal is that it must be economical. Metallic bellows are available, but their cost is prohibitive for the particular application, with which applicant is concerned. For example, a multi-ply bellows might cost in the neighborhood of $200.00, whereas a requirement of say, for example, $6.00 is necessary for a shaft seal, which would be suitable for the particular circuit-breaker application under consideration.

SUMMARY OF THE INVENTION

The improved torsional rotary shaft seal of the present invention comprises an elastomeric annular seal, which is clamped and preferably bonded to both the rotatable shaft and also to the interrupter or case housing. Preferably, suitable adhesives are provided to chemically bond the collar portions of the elastomeric seal to both the rotatable shaft and also to the housing. In addition, to prevent friction between the seal and the housing, there is provided a collar, which is secured to and rotatable with the shaft, and thereby prevents friction occurring between the radially-outwardly extending flange portion of the seal and the stationary housing wall.

In a modification of the invention, an improved rotary shaft seal is provided in which the elastomeric material has one or more convolutions provided, and between the folds of the convolutions there again is preferably provided a non-friction collar at the end convolutions.

Accordingly, it is a general object of the present invention to provide an improved torsional rotary shaft seal.

Still a further object of the present invention is to provide an improved torsional rotary shaft seal adaptable for applications in which gas pressure exists within a housing, and only a limited angular throw of a shaft is utilized.

Still a further object of the present invention is to provide an improved hermetic torsional rotary shaft seal in which portions of the seal are chemically bonded to both the shaft and also to the container housing.

Further objects and advantages will readily become apparent upon reading the following specification, taken in conjunction with the drawings.

DESCRIPTION OF THE PREFERRED EMBODIMENTS

Figure 1:
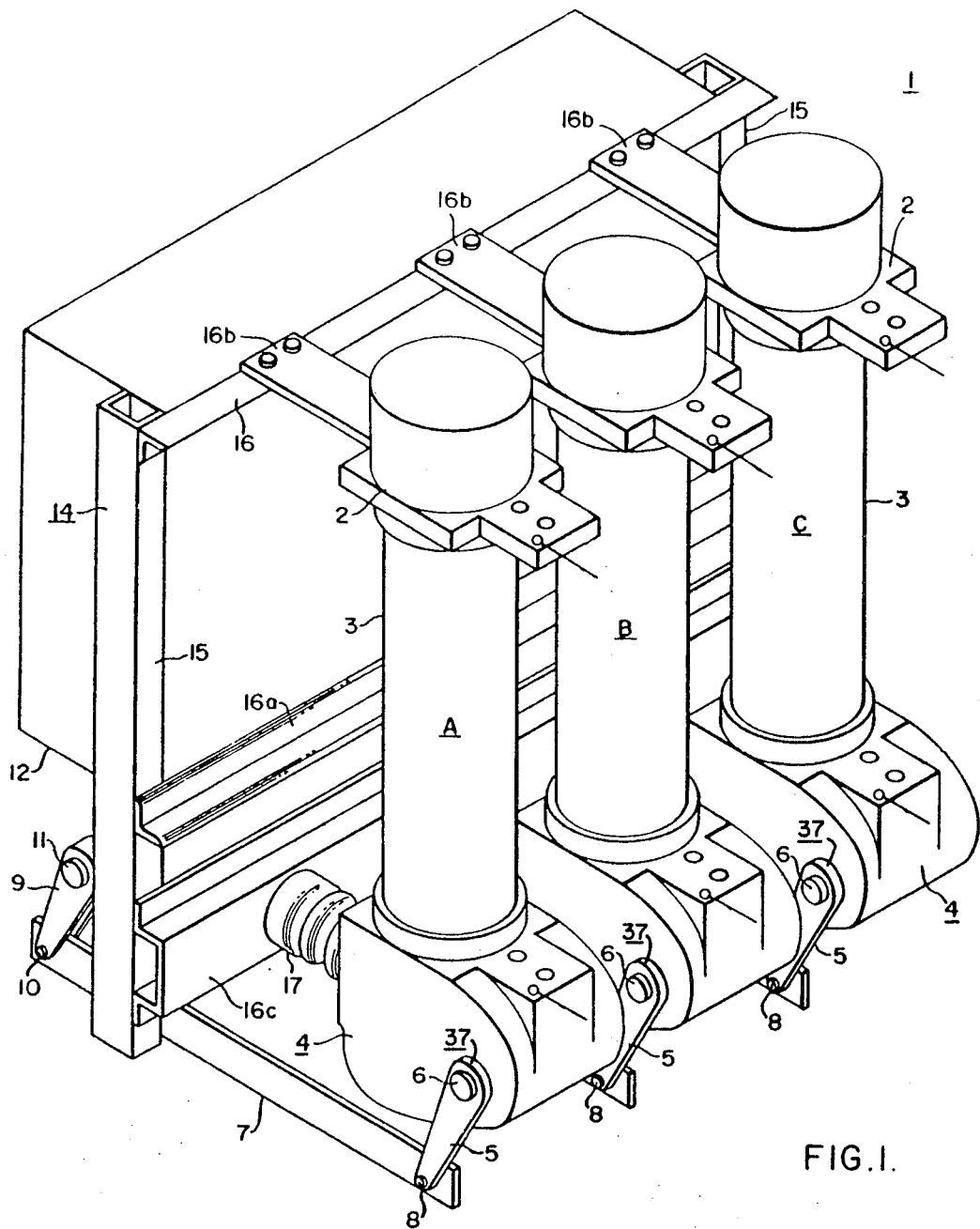
FIG. 1 illustrates a perspective view of a three-pole circuit interrupter illustrating a typical equipment embodying the improved seals of the present invention.

Referring to FIG. 1, there is generally illustrated a three-pole circuit interrupter of the sulfur-hexafluoride type. This circuit interrupter is described in detail in U.S. Pat. application filed Jan. 8, 1968, Ser. No. 696,415, and refiled as continuation-in-part patent application, Ser. No. 51,709, filed July 1, 1970 by Stanislaw A. Milianowicz, entitled "Fluid-Blast Circuit Interrupter With Insulating Arc Shield", and assigned to the assignee of the instant application.

As illustrated in FIG. 1, reference numeral 1 generally designates a three-pole fluid-blast circuit interrupter comprising three spaced pole assemblies, A, B, and C. As will be apparent from FIG. 1, each pole assembly includes, generally an upper end plate 2, a generally upstanding cylindrical housing 3, and a lower end plate and mechanism housing 4. Disposed exteriorly of the mechanism housing 4 is a drive crank 5 affixed to an operating shaft 6, and a generally horizontally reciprocally movable insulating operating rod 7 is pivotally secured to the external operating crank 5, as at 8, and is connected to a drive crank 9 through a pivotal connection 10. The three drive cranks 9, only one of which is shown, are affixed and rotatable with an operating drive shaft 11, which is connected to a suitable mechanism 12, which constitutes no part of the present invention, and may be of the type set forth in U.S. Pat. No. 3,183,332, issued May 11, 1965 to Russell E. Frink and Paul Olsson, and assigned to the assignee of the present invention.

It will be apparent from FIG. 1 that a suitable supporting grounded framework 14 is utilized comprising vertical channel members 15 with interbracing structural steel members 16, 16a having horizontally extending insulating support straps 16b secured thereto, which assist in supporting the interrupting assemblies. Additionally, lower insulator supports 17 may be employed extending generally horizontally from a channel support member 16c, the latter being affixed to the vertical support channels 15.

Figures 2, 3, 5, 6:
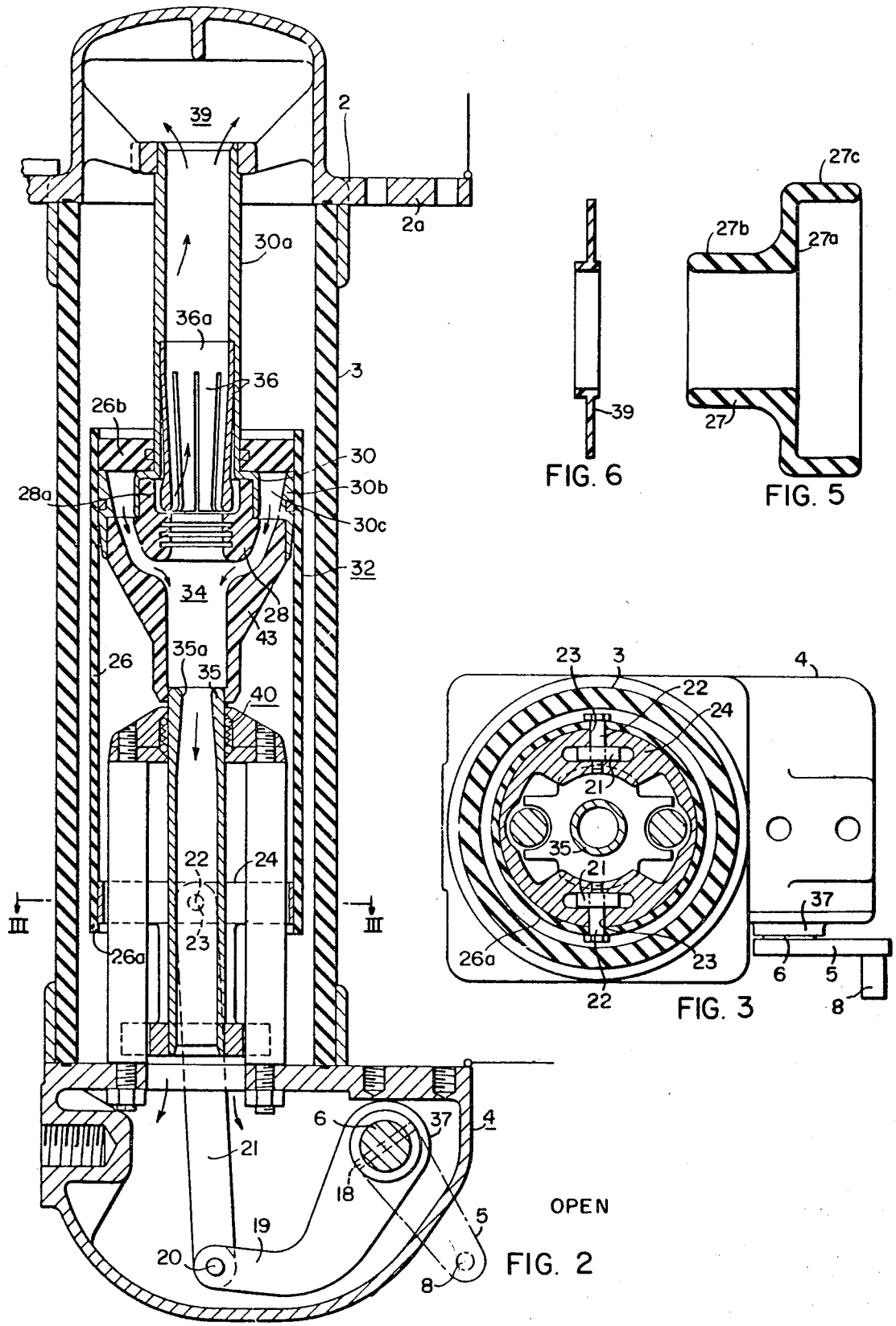
FIG. 2 illustrates the fully-open circuit position of the movable contact structure disposed internally of the interrupter casing.
FIG. 3 is a sectional view taken substantially along the line III—III of FIG. 2.
FIG. 5 is a detailed view of the seal.
FIG. 6 is a detailed view of the friction-resisting collar utilized in the assembly of the improved rotary shaft seal of the present invention; and, FIG. 7 is a modification of the improved torsional rotary shaft seal of the present invention involving one or more convolutions.

FIGS. 2 and 3 more clearly illustrate the internal construction of each of the interrupting assemblies. With reference to FIG. 2, it will be noted that there is provided the cylindrical housing 3 of a suitable insulating material having at one end thereof the end closure plate 2 having a line terminal connection 2a constituting an integral part thereof. At the opposite end of the tubular housing 3 is the operating casting 4, within which extends the rotatable operating shaft 6 having affixed thereto, as by a key pin 18, an internally-disposed operating crank 19, the latter being pivotally connected, as at 20, to a pair of metallic operating links 21. The upper ends of the operating links 21, as viewed in FIGS. 2 and 3, are pivotally connected to a pivot pin 22, the latter extending through apertures 23 provided in a spider-like actuator 24, which is fastened, to the end 26a of a movable operating cylinder 26 having a closed end plate portion 26b.

It will be observed that an insulating arc shield 28 has an axially-extending flange portion 28a, which is interposed within a cup-shaped stationary contact housing 30, which is elongated, as at 30a, to provide a guiding support for the movable cylinder end plate 26b of the puffer assembly, generally designated by the reference numeral 32. Contact housing 30 and portion 30b of the contact housing 30, comprise collectively a stationary piston, which is supported by the depending tubular guide 30a. Item 30c is a multiple opening in piston 30, 30b which admits gas to the insulating arc chamber 43.

Thus, during the opening operation of the interrupter, the operating linkage 21, pivotally connected to the movable puffer assembly 32, causes downward gas-compressing motion of the movable cylinder end plate 26b over the tubular guide support 30a, and causes gas to flow into the insulating stationary arc chamber 34.

It will be observed that the movable contact 35 is vented, having a vent opening 35a therethrough, and cooperates with a plurality of flexible stationary contact fingers 36, which constitutes generally a slotted tubular member 36a inserted into the cylinder guide support 30a.

Thus, during the initial portion of the opening operation, the initially-established arc is confined by the corrugated insulating arc shield 28, and is protected from the lateral blasting effect of relatively cool gas caused by compressing motion of the movable piston ring 26b, thus causing less energy to be released at the arc than if it had not been so protected.

It will be noted that the compressed gas, directed laterally into the arc stream, flows in opposite directions through the movable tubular vented contact 35 and also through the hollow vented guide support 30a into the exhaust chamber 39.

Figure 4:
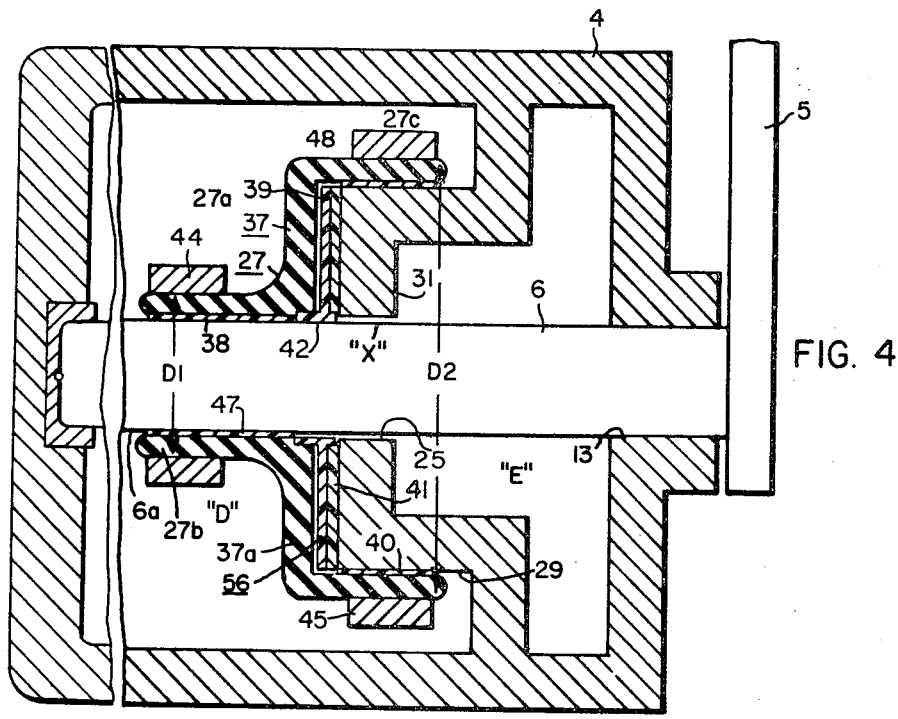
FIG. 4 is an enlarged view showing the improved torsional rotary shaft seal of the present invention.

The improved seal 37 of the present invention is more particularly set forth in FIGS. 4–6 of the drawings.

As shown in FIG. 4, the rotary shaft 6 extends through an aperture 13 in the housing 4 and also through an aperture 25 provided in a partition plate portion 31 of the housing 4. The inner end 6a of the rotary shaft 6 is journaled in a bearing portion 33 of the mechanism housing 4. As shown, the seal 37 is clamped and bonded both to the assembly housing 4 and to the shaft 6, and is stressed when movement of the actuating arm 5 causes the shaft 6 to rotate. Since there is gas at high pressure in volume "D" and air at atmospheric pressure in volume "E", the seal 37 is subjected to frictional wear, which must be minimized. This is achieved by incorporating a friction-resisting collar 39, composed of a suitable friction-resisting material, such as Teflon. Additionally, a frictionless washer 41 is provided, which also may be made of Teflon, or other suitable friction-resisting material. The Teflon collar 39 has an interference fit on the shaft 6, as at 42, and this prevents any tendency for the seal material to be trapped between the shaft 6 and the partition-plate portion 31 due to the high pressure in volume "D". If this were to occur, significant erosion of the seal 37 could occur. When the shaft 6 rotates, the Teflon collar 39 tends to move with it. The presence of the Teflon washer 41 protects the Teflon collar 39 from frictional wear against the partition-plate portion 31, and should permit some relative motion between the smooth Teflon surfaces 39, 41, when the shaft 6 rotates.

The shaft 6 has a clearance fit into the aperture 25 of the housing 4 at the low-pressure side E of the seal, as shown in FIG. 4. The seal 27, at both diameters $D_1$ and $D_2$, is undersized relative to the shaft 6 and housing portion 29, respectively, so that a tight fit occurs at both places.

Adhesives are used to bond the seal 37 to both the shaft 6 and housing portion 29. The clamps 44, 45 used to strengthen the bonds 38, 40 should have smooth, large-radiused contours at their edges, which contact the seal body 27. This is to prevent any tendency for the clamp to cut into the seal 27 if a fold should develop in the rubber, or elastomeric material, or any other sufficiently flexible material, of which the seal 27 might be made, during motion.

FIG. 5 shows, in detail, the seal 27 for use with the actuating shaft 6. It will be noted, with reference to FIG. 5 of the drawings, that the annular seal member 27 of elastomeric material has an axially-extending collar portion 27b and an integral radially outwardly-extending flange portion 27a of considerable extent, terminating in an axially-extending enlarged collar portion 27c. The radially outwardly-extending flange portion 27a of the seal 27 is closely adjacent the wall portion 31 of the housing 4, and friction-reducing plate means 56 is interposed between the wall portion 31 and the radially outwardly-extending flange portion 27a of the elastomeric seal 27 to prevent friction and binding there-between. For example, hexafluoride sulfur hexaflouride circuit breaker, which is to contain $SF_6$ gas at 75 psi, at an ambient temperature of 20°C. Preferably, the seal material 27 is neoprene, which has been successfully used for 0-ring seals in sulfur-hexafluoride interrupters. The neoprene material is capable of withstanding the temperature extremes to which the breaker 1 may be subjected of —40°C. to 105°C., in addition to transient temperatures of about 250°C. The material will not crack or fracture at —45°C.

The total angular movement of the shaft 6 during circuit-breaker actuation is 72°, which represents the total contact stroke. The seal 27 is to be assembled so that it is in the unstrained position in the middle of the contact stroke i.e., when the shaft 6 is rotated 36° from either its opened or closed end positions. Consequently, when the breaker 1 is opened or closed, the seal 27 is in a strained position.

The adhesive 47 used to bond the seal to the hot-rolled steel shaft 6 is Carboline F.I., which is a neoprene-based rubber cement; the adhesive 48 to bond the seal 27 to the aluminum housing portion 29 is a two-part epoxy resin, Chemlock 305 is used.

Stressed concentration points may occur in the neoprene where right-angled, or other sharp corners occur. Such points may be avoided by increasing the radius of curvatures at these places substantially. This applies particularly to the seal 27 adjacent to the Teflon collar 39, both where the seal 27 joins the container housing 4, and where it joins the shaft 6. This necessitates using a Teflon sleeve 39 contoured at all points to match the seal profile, and force-fitted onto the shaft 6.

Figure 7:
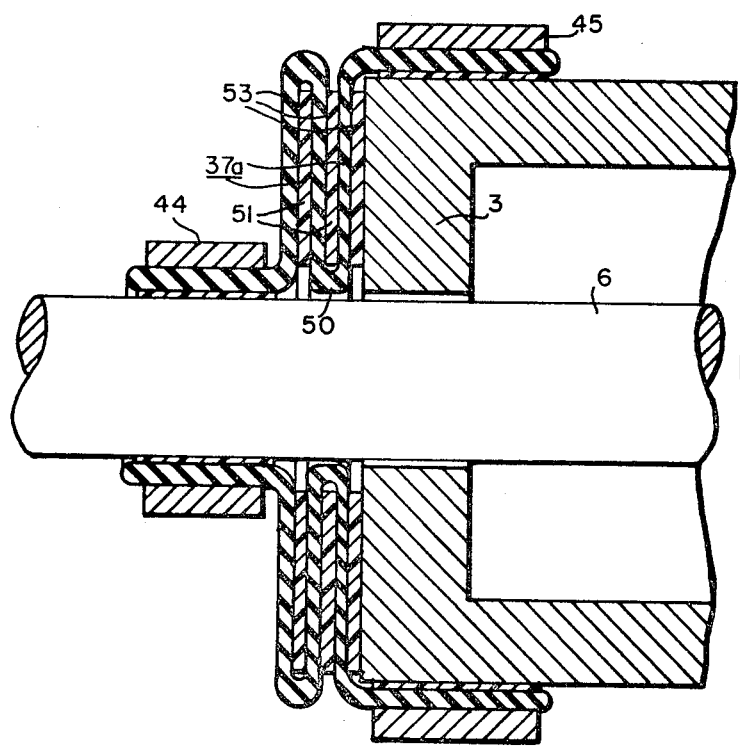

A further modification of the invention involves constructing the seal 37a by introducing convolutions 50 of the elastomeric material, or rubber, as shown in FIG. 7. Teflon collars 51 are required, with Teflon washers in contact with the shaft.

From the foregoing description, it is apparent that there has been provided an improved torsional rotary shaft seal 37, which is adaptable for resisting leakage, and maintaining a long operational life. The seal 27 has a considerable radially-outwardly extending flange portion 27a (FIG. 5), which is contiguous to an assembly of friction-resisting components involving the collar 39 and the washer 41, which together collectively resist friction between the neoprene flange material 27a of the seal 27 and the stationary housing wall 31, at the portion "X". The convolutions 50 in the modification of the invention illustrated in FIG. 7 provide additional means for preventing friction at the convolutions 50 of the seal.

Although there has been illustrated and described specific structures, it is to be clearly understood that the same were merely for the purpose of illustration, and that changes and modifications may readily be made therein by those skilled in the art without departing from the spirit and scope of the invention.

I claim as my invention:

1. A rotary shaft seal assembly comprising, in combination, a shaft, means for providing rotary motion of said shaft, a housing having an opening therein through which said shaft extends, a seal formed of an elastomeric material and clamped to both said shaft and also to said housing, said seal having a radially outwardly-extending flange portion, said housing having a wall portion closely adjacent said radially-outwardly-extending flange portion of the elastomeric seal, and friction-reducing plate means interposed between said wall portion and said redially outwardly-extending flange portion of the elastomeric seal to prevent friction and binding therebetween.

2. The rotary shaft seal assembly of claim 1, wherein the friction-reducing plate means comprises a collar secured to the shaft.

3. The combination of claim 2, wherein the collar is formed of a material comprising a polymer of fluorinated ethylene selected from the group consisting of polytetrafluoroethylene and polychlorotrifluoroethylene.

4. The combination of claim 2, wherein a friction-resisting washer is interposed between the collar and the wall of the housing.

5. The combination of claim 4, wherein the washer is formed of a material comprising a polymer of fluorinated ethylene selected from the group consisting of polytetrafluoroethylene and polychlorotrifluoroethylene.

6. A rotary shaft seal assembly comprising, in combination, a shaft, means for providing rotary motion of said shaft, a housing having an opening therein through which said shaft extends, a seal formed of an elastomeric material and clamped to both said shaft and also to said housing, said seal having a radially outwardly-extending flange portion, said housing having a wall portion closely adjacent said radially outwardly-extending flange portion of the elastomeric seal, and said radially outwardly-extending flange portion of the elastomeric seal comprising one or more convolutions.

7. The combination of claim 6, wherein at least one washer of friction-resisting material is located in a convolution.

8. A rotary shaft seal assembly comprising, in combination, a shaft, means for providing rotary motion of said shaft, a housing having an opening therein through which said shaft extends, a seal formed of an elastomeric material and chemically bonded to both said shaft and also to a portion of said housing by adhesive means, said seal having a radially outwardly-extending flange portion, said housing having a wall portion closely adjacent said radially outwardly-extending flange portion of the elastomeric seal, and friction-reducing plate means interposed between said wall portion and said radially outwardly extending flange portion of the elastomeric seal to prevent friction and binding therebetween.

9. The rotary shaft seal assembly of claim 8, wherein the friction-reducing plate means comprises a collar secured to and rotatable with the shaft.

10. The combination of claim 9, wherein the collar is formed of a material comprising a polymer of fluorinated ethylene selected from the group consisting of polytetrafluoroethylene and polychlorotrifluoroethylene.

* * * * *